United States Patent

Murase et al.

[11] Patent Number: 5,832,303
[45] Date of Patent: Nov. 3, 1998

[54] LARGE SCALE INTERCONNECTING SWITCH USING COMMUNICATION CONTROLLER GROUPS WITH MULTIPLE INPUT-TO-ONE OUTPUT SIGNAL LINES AND ADAPTABLE CROSSBAR UNIT USING PLURALITY OF SELECTORS

[75] Inventors: Shoichi Murase, Kawasaki, Japan; Haruyuki Nakayama, Washington, D.C.; Takeshi Aimoto, Sagamihara; Hiroshi Iwamoto, Hadano, both of Japan

[73] Assignee: Hitachi, Ltd., Tokyo, Japan

[21] Appl. No.: 516,392

[22] Filed: Aug. 17, 1995

[30] Foreign Application Priority Data

Aug. 22, 1994 [JP] Japan ................................ 6-196605
Sep. 22, 1994 [JP] Japan ................................ 6-227585

[51] Int. Cl.⁶ .................................................. G06F 15/16
[52] U.S. Cl. ........................ 395/856; 395/825; 395/826; 395/858
[58] Field of Search ........................... 340/825.79, 825.8, 340/825.85, 360; 370/352, 360; 371/20.1; 395/200.01, 872, 139, 311, 449, 825, 826, 856, 858; 364/713; 365/230.03

[56] References Cited

U.S. PATENT DOCUMENTS

| | | | |
|---|---|---|---|
| 4,852,083 | 7/1989 | Niehaus et al. | 370/381 |
| 4,929,939 | 5/1990 | Varma et al. | 340/825.8 |
| 4,933,930 | 6/1990 | Lien et al. | 370/441 |
| 4,972,445 | 11/1990 | Terada et al. | 375/377 |
| 4,975,901 | 12/1990 | Poli | 340/360 |
| 5,053,942 | 10/1991 | Srini | 395/311 |
| 5,111,414 | 5/1992 | Arrathoon | 364/713 |
| 5,197,064 | 3/1993 | Chao | 370/398 |
| 5,241,641 | 8/1993 | Iwasa et al. | 395/449 |
| 5,325,224 | 6/1994 | Lang et al. | 395/139 |
| 5,347,270 | 9/1994 | Matsuda et al. | 340/825.8 |
| 5,410,300 | 4/1995 | Gould et al. | 340/825.79 |
| 5,412,380 | 5/1995 | Matsuda et al. | 340/825.85 |
| 5,420,853 | 5/1995 | McRoberts et al. | 370/360 |
| 5,422,880 | 6/1995 | Heitkamp et al. | 370/352 |
| 5,453,990 | 9/1995 | Aoki et al. | 371/20.1 |
| 5,475,383 | 12/1995 | Ohta et al. | 340/825.79 |
| 5,506,815 | 4/1996 | Hsieh et al. | 365/230.03 |
| 5,530,904 | 6/1996 | Koga | 395/872 |
| 5,550,978 | 8/1996 | Takahashi et al. | 395/200.01 |
| 5,604,865 | 2/1997 | Lentz et al. | 395/311 |

FOREIGN PATENT DOCUMENTS

WO 89/09967  10/1989  WIPO .

*Primary Examiner*—Thomas C. Lee
*Assistant Examiner*—Chien Yuan
*Attorney, Agent, or Firm*—Antonelli, Terry, Stout & Kraus, LLP

[57] ABSTRACT

A large-scaled interconnection switch in which a plurality of data processors are interconnected to perform data transfer between one another. The switch includes communication controllers, one provided for each of the plurality of data processors, divided into groups, for controlling communication between the data processors. Each group of communication controllers is connected by a signal line having a multiple bit width. A switch arbiter for arbitrates switch setting requests for interconnection of the data processors from the communication controllers to output a switch setting control signal. The switch also includes bit slice switches having a predetermined bit division count and to which respective/output signal lines are connected which bit-divide input/output signals of the communication controllers. The bit slice switch receives a switch setting control signal from the switch arbiter and transfers data from a transmission data line from a communication controller to a receiving data line to the communication controller on the basis of the switch setting control signal.

7 Claims, 7 Drawing Sheets

LARGE SCALE INTERCONNECTING SWITCH USING COMMUNICATION CONTROLLER GROUPS WITH MULTIPLE INPUT-TO-ONE OUTPUT SIGNAL LINES AND ADAPTABLE CROSSBAR UNIT USING PLURALITY OF SELECTORS

BACKGROUND OF THE INVENTION

The present invention relates to large-scaled interconnection switches which interconnect many data processors and crossbar parts used therewith.

An interconnection switch is used to interconnect data processors to transfer data therein and includes crossbar switches and multi-stage switches. When the interconnected processors increase in number beyond a given limit, signal lines connected to the interconnection switches increase excessively and the circuit scale becomes excessively large. Thus, the interconnection switch is usually composed of a plurality of switch parts. One example of such construction is a bit slice crossbar system. (For example, "Parallel Processing Symposium JSPP '94" held May 18–20, 1994, collected articles p. 196).

The bit slice system divides the width of transfer data by a plurality of switch parts (hereinafter referred to as "crossbar parts") to transfer the resulting data. A combination of Y crossbar parts of N-to-one selectors having a W-bit width brings about an interconnection switch having a W x Y bit width.

One type of crossbar part switch setting system uses an arbiter which arbitrates switch setting requests from all the data processors to set all the crossbar part switches. However, according to this system, when the number of connected processors exceeds a given limit, the arbiter itself becomes large-scaled because the number of signal lines connected to the arbiter becomes excessively large or the performance of the arbiter becomes extremely deteriorated because the number of interconnected processors is large if the connection to the arbiter is performed by buses, disadvantageously.

According to this system, the number of interconnectable data processors is fixed, so that individual crossbar parts are required to be manufactured in correspondence to the number of interconnected processors which the customer requires each time the customer does so. Thus, time and cost are undesirably increased.

SUMMARY OF THE INVENTION

It is therefore an object of the present invention to solve the above problems found in the prior art and to realize a high-speed large-scaled interconnection switch by reducing the number of signal lines connected to the respective elements of the switch.

A large-scaled interconnection switch in accordance with the present invention includes a plurality of multiple input-to-one output signal lines, one connecting a group of communication controllers in a wide bit width with a common switch arbiter, and a plurality of signal dividing lines, one connecting a communication controller and a corresponding bit slice switch.

A large-scaled interconnection switch in accordance with the present invention includes a plurality of multiple input-to-one output signal lines, one connecting a group of communication controllers in a wide bit width with a common switch arbiter, and a plurality of signal dividing lines, one connecting a communication controller and a corresponding bit slice switch such that an input/output of the communication controller is bit-divided and connected to a corresponding bit slice switch in a one-to-one relationship. Thus, communication between the switch arbiter and a communication controller which cannot bit-divide its input/output and performs only relatively intermittent communication, and communication between a bit slice switch and a communication controller which successively performs communication and is capable of bit-dividing its input/output are achieved at high speed, and the number of signal lines connected to the elements concerned are reduced, advantageously.

It is another object of the present invention to provide a crossbar part having a new structure which solves the above problems and which is capable of permitting fabrication of a crossbar network device easily even when the number of data processors to be connected changes.

The object of the present invention mentioned above is effectively solved by a selector control means provided in the crossbar part which comprises means for setting as control data a desired connection count of data processors which exchange data (hereinafter referred to as "device connection count") and means for changing a transfer data width allocated to each of the data processors in dependence on the value of the device connection count. The use of such a selector control means brings about the composition of a crossbar network device, which corresponds to a device connection count which the customer requires, with a single kind of crossbar part having a standard structure.

When there is a request for a selector setting from the transmission side data processor, a change of the transfer data width allocated to each data processor is easily realized by using means for selecting a target selector to be controlled from among the plurality of selectors on the basis of the value of the connection device count and changing the selected selector from a non-operating state to an operating state. When there is a request for switch release from the transmission side data processor, the transfer data width changing means preferably returns the selector from the operating state to the non-operating state. The inventive crossbar part may be composed, for example, of H selectors having a single- or multi-bit width of P and a select ratio of H:1. In the embodiments of the present invention to be described hereinafter, a crossbar part was composed of 32 2-bit width selectors having a select ratio of 32:1 to thereby produce a preferable result.

DESCRIPTION OF THE PREFERRED EMBODIMENTS

Figure 1:
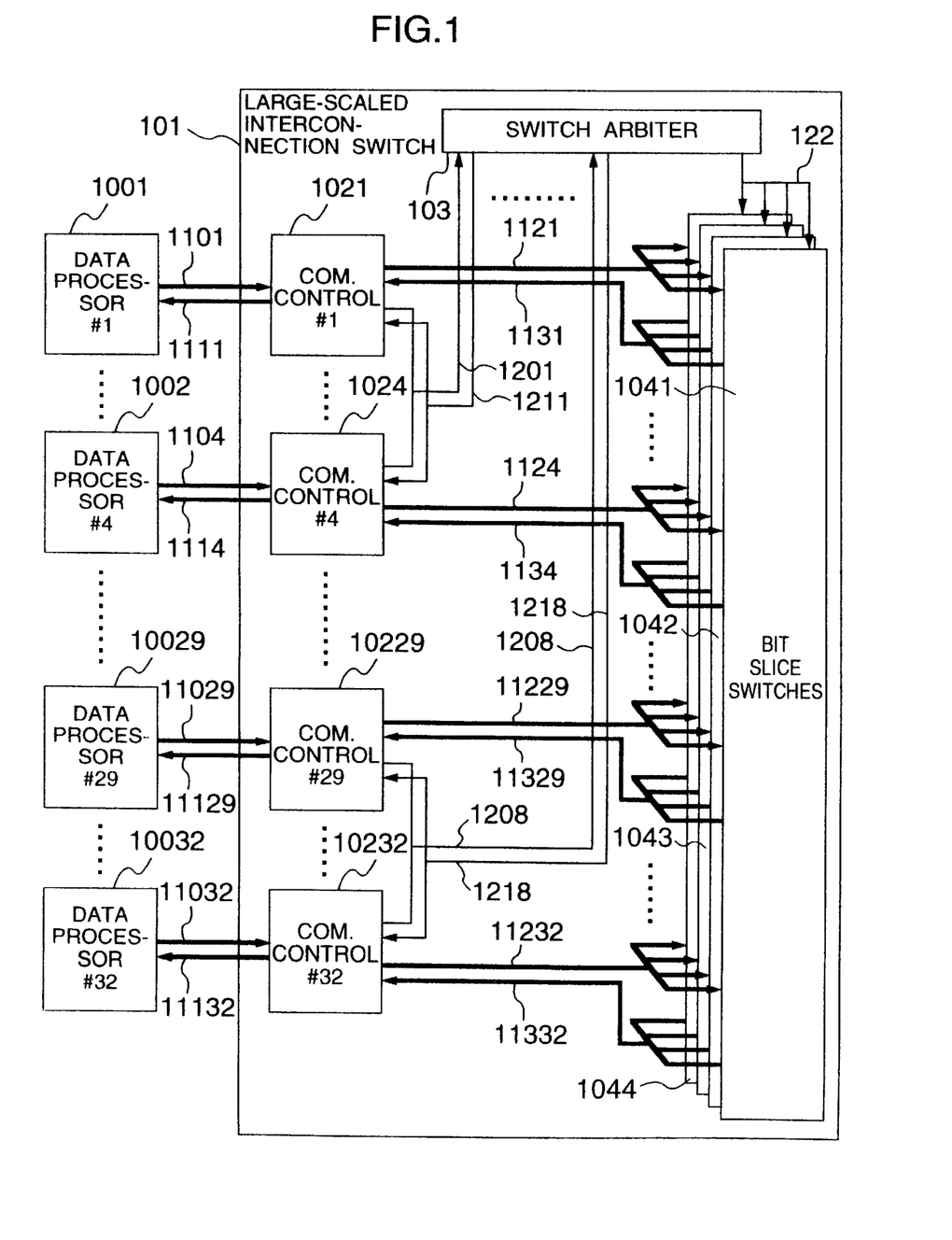
FIG. 1 is a block diagram of a whole system of a first embodiment of the present invention.

FIG. 1 shows a whole system of an embodiment of the present invention. The system includes a plurality of data processors 1001–10032 (#1–#32) and a switch 101 which transfers data between the data processors. The switch 101 includes communication controllers 1021–10232 disposed for the corresponding data processors 1001–10032 to control communications, a switch arbiter 103 which arbitrates switch setting requests from the communication controllers 1021–10232 to provide switch setting control, and bit slice switches 1041–1044 which transfer bit-divided data from the appropriate one of transmission data lines 1121–11232 set by the switch arbiter 103 to the appropriate one of reception data lines 1131–11332 set by the switch arbiter. In this embodiment, the number of data processors 1001–10032 connected to the switch 101 is 32, and the switch 101 includes 32 communication controllers 1021–10232. The switch 101 includes 8 switch setting request lines 1201–1208 and 8 switch setting end reporting lines 1211–1218, each connected to 4 ones of the communication controllers 1021–10232.

Figure 4:
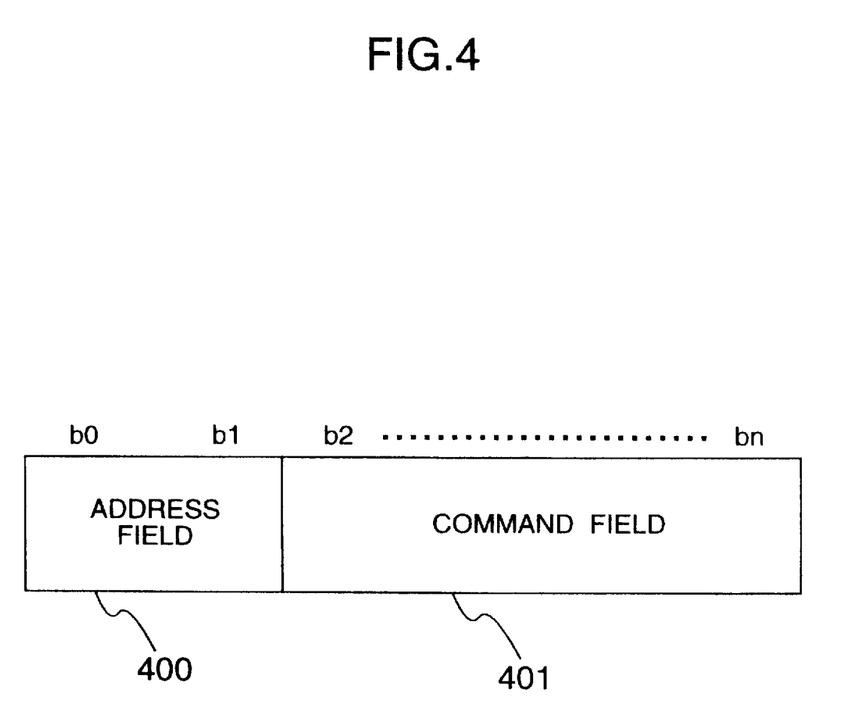
FIG. 4 shows a format of a signal on each of a switch setting request line and switch setting end reporting line.

FIG. 4 shows a format of signals on the switch setting request lines 1201–1208 and the switch setting end reporting lines 1211–1218. Signals on the switch setting request lines 1201–1208 and the switch setting end reporting lines 1211–1218 are each composed of an address field 400 of a 2-bit length and a command field 401 of an n-bit length. The address fields identify the respective four communication controllers 1021–10232 connected to the corresponding switch setting request lines 1201–1208 and switch setting end reporting lines 1211–1218.

In data transmission, when some of the communication controllers 1021–10232 receive transfer data from the corresponding ones of the data processor 1001–10032 through the corresponding ones of the transmission lines 1101–11032, those communication controllers transmit corresponding switch setting requests through the corresponding ones of the switch setting request lines 1201–1208 to the switch arbiter 103, which arbitrates on the basis of predetermined conditions switch setting requests from all the switch setting request lines 1201–1208 and sets the bit slice switches 1041–1044 through the switch setting lines 122 and reports the completion of the switch setting through the appropriate one of the switch setting end reporting lines 1211–1218 to the corresponding one of the communication controllers 1021–10232. The appropriate one of the communication controllers 1021–10232 transfers data to the appropriate one of the reception side communication controllers 1021–10232 through the corresponding ones of the transmission data lines 1121–11232, bit slice switches 1041–1044 and reception data lines 1131–11332. When the reception side appropriate one of the communication controllers 1021–10232 receives data, it transfers the data through an appropriate one of the reception lines 1111–11132 to the appropriate reception side one of the data processors 1001–10032. When the appropriate transmission side one of the communication controllers 1021–10232 ends data transmission, it transmits a switch release request through the appropriate one of the switch setting request lines 1201–1208 to the switch arbiter 103. The switch arbiter 103 releases the bit slice switches 1041–1044 through the switch setting line 122 and reports the completion of the switch release to the appropriate one of the communication controllers 1021–10232 through the corresponding one of the switch setting end reporting lines 1211–1218.

Figure 2:
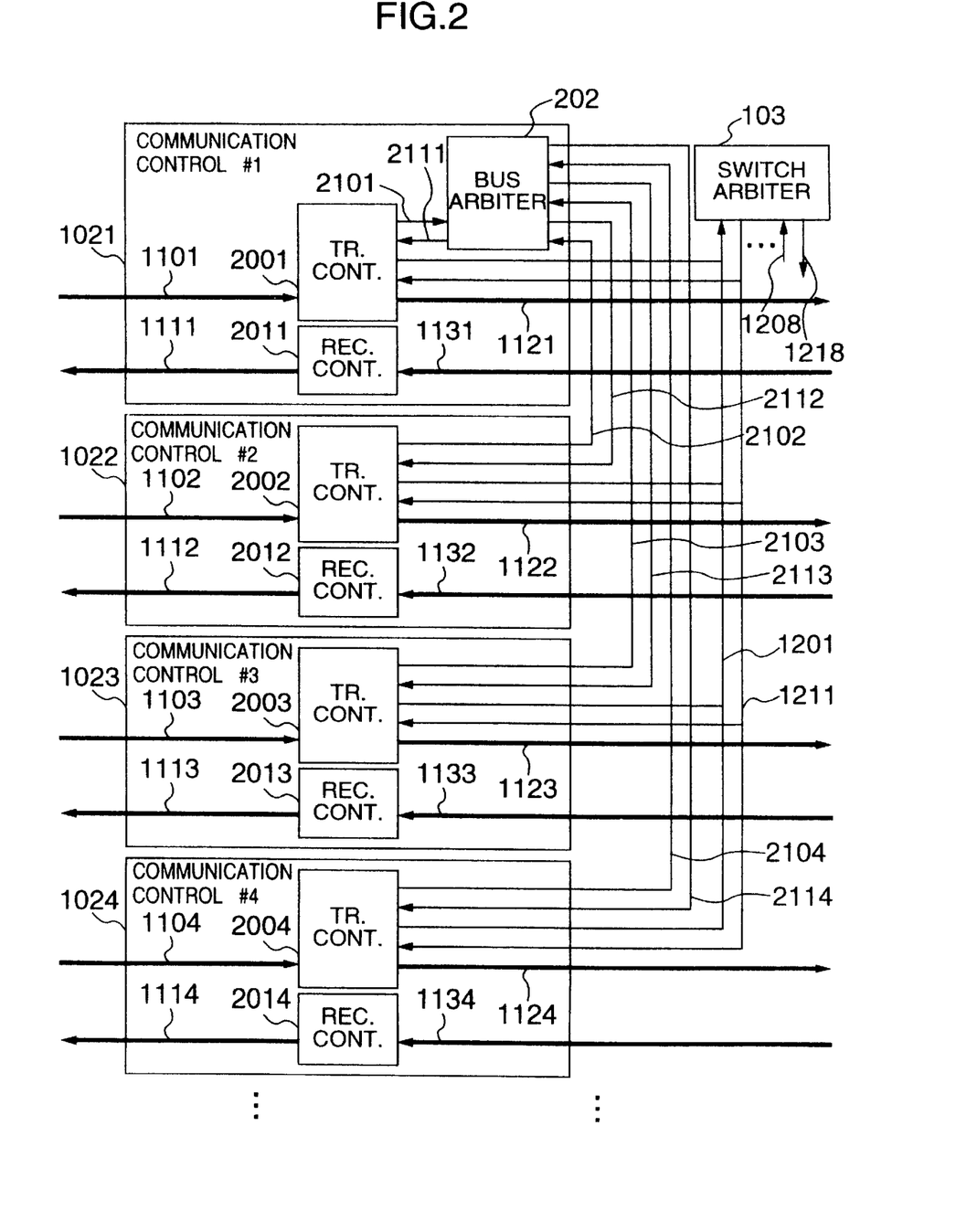
FIG. 2 is a block diagram indicative of the details of a communication controller shown in FIG. 1.

FIG. 2 shows the details of first 4 ones of the communication controllers 1021–10232 (other sets of four structures each have the same structure). The communication controllers 1021–1024 basically include transmission controllers 2001–2004 which control the transmission of data and reception controllers 2011–2014 which control the reception of data, respectively. One of the communication controllers 1021–1024 connected to a switch setting request line 120 includes a bus arbiter 202 which arbitrates switch setting request lines 1201. In FIG. 2, the communication controller 1021 includes a bus arbiter 202. The switch setting request line 1201 and the switch setting end reporting line 1211 are connected to the four transmission controllers 2001–2004. The transmission controllers 2001–2004 of the communication controllers 1021 #1-1024 #4 are connected to the bus arbiter 202 of all the communication controller 1021 through the bus request lines 2101–2104 and bus ground lines 2111–2114.

In the data transfer, when the transmission controllers 2001–2004 receive transferred data through the transmission lines 1001–1004, they first transmit requests for use of the switch setting request line 1201 to the bus arbiter 202 through the bus request lines 2101–2104, respectively. The bus arbiter 202 arbitrates the requests for use of the switch setting request line 1201 from the four transmission controllers 2001–2004 to select one of the requests and transmits permission for use of the switch setting request line 1201 through the appropriate one of the bus ground lines 2111–2114 to the appropriate transmission controller. After the appropriate one of the transmission controllers 2001–2004 receives permission for use of the switch setting request line 1201, the appropriate transmission controller transmits a switch setting request to the switch arbiter 103 through that switch setting request line 1201. After the appropriate transmission controller receives a switch setting end report from the switch arbiter 103 through the switch setting end reporting line 1211, it transmits data through the appropriate one of the transmission data lines 1121–1124. When the appropriate one of the transmission controllers 2001–2004 transmits a switch setting request to the switch arbiter 103 through the switch setting request line 1201, it sets its own address in the address field 400 and sends that address. The address field 400 has a length of 2 bits which expresses 0–3; i.e., the communication controllers 1021–1024 are designated by 0–3, respectively. When the appropriate one of the transmission controllers 2001–2004 receives a switch setting end report through the switch setting end reporting line 1211 and only when the address field 400 of the end report indicates its own communication controller 1021–1024, then the communication controller 1021–1024 receives the switch setting end report.

When the reception controllers 2011–2014 receive data from the reception data lines 1131–1134, respectively, they transmit the data to the data processors 1001–1004 through the reception lines 1111–1114, respectively.

Figure 3:
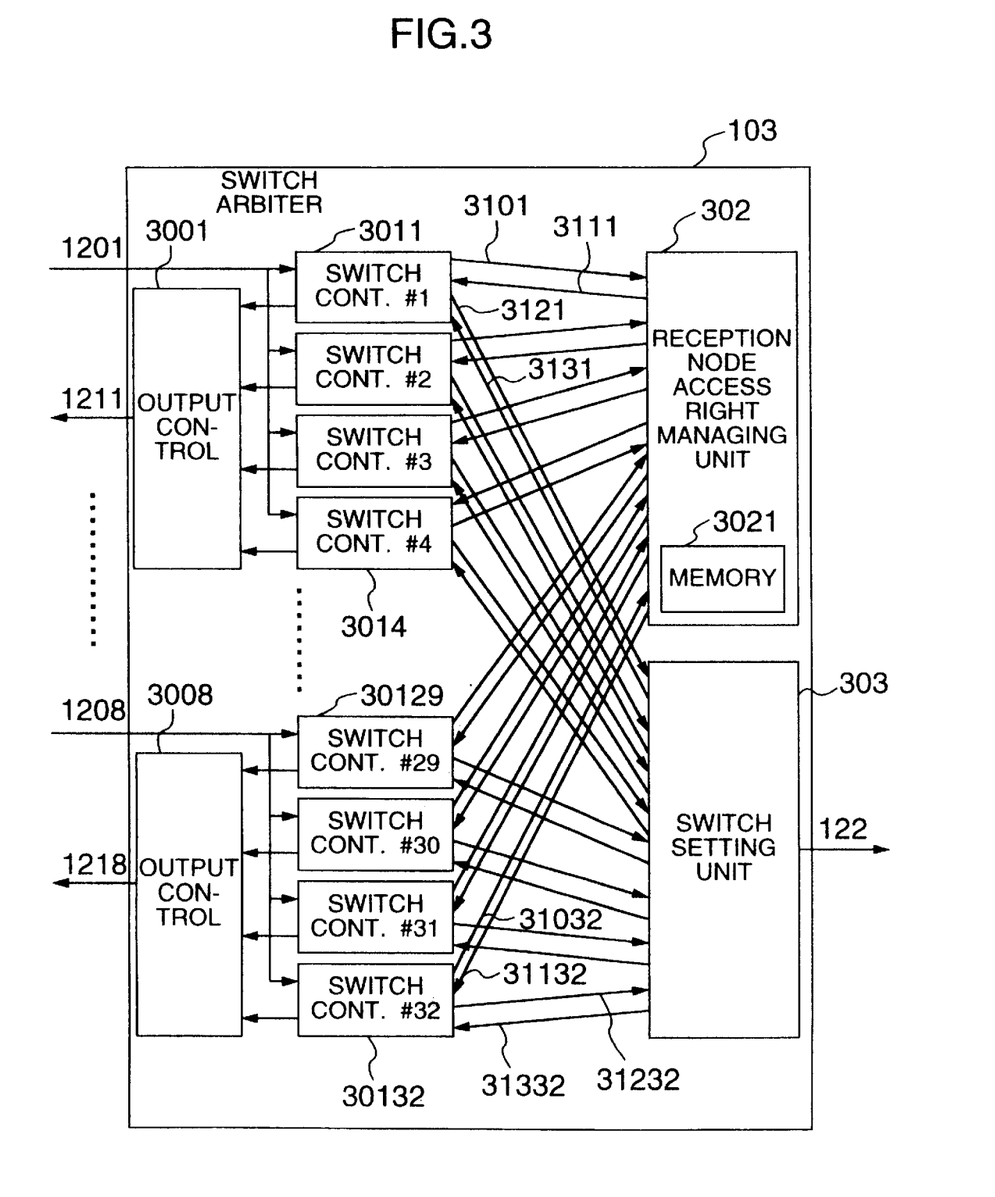
FIG. 3 is a block diagram indicative of the details of a switch arbiter shown in FIG. 1.

FIG. 3 shows the details of the switch arbiter 103, which is composed of switch controllers 3011–30132 which control the switching operations, a reception node access right manager 302 which manages access rights from the respective reception nodes to arbitrate switch setting for the same reception node, a switch setting unit 303 which arbitrates the transmission of data from all the switch controllers 3011–30132 to the switch setting line 122, and output controllers 3001–3008 which arbitrate the transmission of data from 8 sets of four switch controllers 3011–3014, 3015–3018, . . . , 30129–30132 to the switch setting end reporting lines 1211–1218, respectively. The switch control unit 3011–3014 are provided for the corresponding transmission controllers 2001–2014. The output controllers 3001–3008 are provided for the respective switch setting end reporting lines 1211–1218. The reception node access right manager 302 is connected to all the switch controllers 3011–30132 through the access right acquisition request lines 3101–31032 and access right acquisition end reporting lines 3111–31132, respectively. The switch setting unit 303 is connected to all the switch controllers 3011–30132 through corresponding setting request lines 3121–31232 and corresponding setting end reporting lines 3131–31332.

When in the data transfer one of the switch controllers 3011–30132 receives a switch setting request whose address field indicates that switch controller through the corresponding one of the switch setting lines request lines 1201–1208, then switch controller requests the reception node access right manager 302 to permit access to the reception node through the corresponding one of the access right acquisition request lines 3101–31032. The reception node access right manager 302 has a memory 3021 which indicates whether the appropriate reception node is in communication. If not, the manager 302 transmits to the appropriate controller permission for access to the requested reception node through the appropriate one of the access right acquisition end reporting lines 3111–31132. Simultaneously, the manager 302 stores in the memory data on the fact that the appropriate reception node is in communication. If the memory indicates that the reception node is in communication, the manager waits until the memory indicates that the reception node is not in communication any longer and then transmits the permission for access. When the appropriate switch controller receives the permission for access to the reception node, it requests the switch setting unit 303 to set the bit slice switches 1041–1044 through the appropriate one of the setting request lines 3121–31232. After the switch setting unit 303 arbitrates requests from all the switch controllers 3011–30132, it sets the bit slice switches 1041–1044 through the switch setting line 122 and transmits a report on the completion of the setting of the appropriate one of the slice switches 1041–1044 to the switch setting unit 303 through the appropriate one of the setting end reporting lines 3131–31332. When the appropriate one of the switch controllers 3011–30132 receives the report on the completion of the setting of the bit line switches 1041–1044, it transmits a report on the completion of the switch setting to the appropriate one of the output controllers 3001–3008. After the appropriate one of the output controllers 3001–3008 arbitrates requests for transmission of data from the four switch controllers 3011–30132 which share the appropriate one of the switch setting end reporting line 121, it transmits to the appropriate one of the transmission controllers 2001–20032 a report on the completion of the switch setting through the appropriate one of the switch setting end reporting lines 1211–1218. At this time, the appropriate output controller sets in the address field 400 a value indicative of the switch controller 3011–30132 which has requested the transmission.

When the appropriate one of the switch controllers 3011–30132 receives a switch release request whose address field 400 indicates that switch controller through the corresponding one of the switch setting request lines 1201–1208, the appropriate switch controller transmits a signal indicative of access end to the reception node to the reception node access right manager 302 through the appropriate one of the access right acquisition request lines 3101–30132. When the reception node access right manager 302 receives the signal indicative of access end, it stores data on whether the appropriate reception node is not in communication in the memory used for this purpose. The appropriate one of the switch controllers 3011–30132 requests the switch setting unit 303 to release the bit slice switches 1041–1044 through the setting request lines 3121–31232. After the switch setting unit 303 has arbitrated requests from all the switch controllers 3011–30132, it releases the bit slice switches 1041–1044 through the switch setting line 122, and transmits a report on the release end of the bit slice switches 1041–1044 to the appropriate one of the switch controllers 3011–30132 through the setting end reporting lines 3131–31332. When the appropriate one of the switch controllers 3011–30132 receives the report on release end of the bit slice switches 1041–1044, it transmits a report on the switch release end to the appropriate one of the output controllers 3001–3008. After the appropriate one of the output controllers 3001–3008 arbitrates requests for transmission of data from the four switch controllers 3011–30132 which share the switch setting end reporting lines 1211–1218, it transmits a report on the switch release end through the appropriate one of the switch setting end reporting lines 1211–1218. At this time, it sets in the address field 400 a value indicative of the appropriate one of the switch controllers 3011–30132 as the transmission requester.

Figure 5:
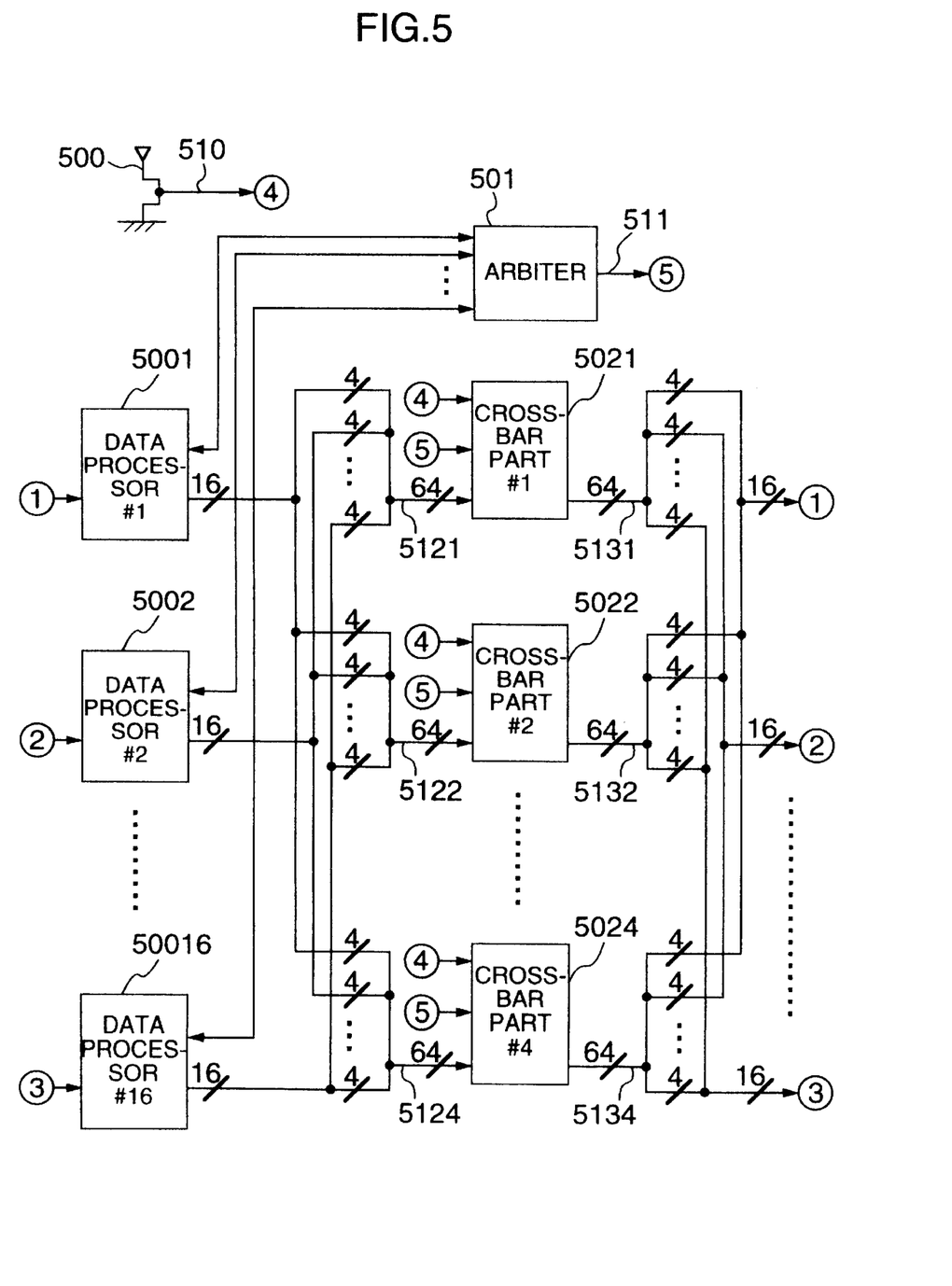
FIG. 5 shows a system indicative of one example of a crossbar network device composed of crossbar parts as another embodiment of the present invention.

Referring to the FIGS. 5–7, crossbar parts of another embodiment of the present invention will be described in detail next. FIG. 5 illustrates one example of a crossbar network device which includes the crossbar parts. Data processors 5001–50016, an arbiter 501 and crossbar parts 5021–5024 are interconnected beforehand as shown on the basis of specifications of connections designed beforehand. In the crossbar network device, data of a 16-bit width is divided and transferred 4 bits at a time among 16 data processors 5001–5016, using the single arbiter 501 and four crossbar parts 5021–5024.

A setting unit 500 delivers to the four crossbar parts 5021–5024 a connection device count selection signal 510 indicating that the number of connected data processors 5001–50016 is 16 and that the width of the transfer data allocated to the respective data processors is 4 bits. The connection device count selection signal 510 is set beforehand in an unchangeable manner by the setting unit 500 on the basis of the specifications of the design when the crossbar network device is assembled, as will be described in detail later. The data processors 5001–50016 are composed such that they can request the arbiter 501 to set or release a selector as in the prior art.

When a transmission side data processor, for example, shown by 5001, requests the arbiter 501 to set a selector, the arbiter 501 sends a selector control signal 511 to four crossbar parts 5021–5024. The respective crossbar parts change the selectors of the crossbars which connect predetermined transmission data lines 5121–5124 and corresponding reception data lines 5131–5134 from a non-conductive state to a conductive state on the basis of the selector control signal 511.

Thereafter, the data processor 5001 divides transmission data of a 16-bit width into four 4-bit data and transmits the 4-bit data through a predetermined transmission data line 5121 to the four crossbar parts 5021–5124, which selectively transmit the four 4-bit width transfer data allocated thereto from the transmission data lines 5121–5124 to the reception data lines 5131–5134. The reception side data processor, for example, shown by 5002 receives the four 4-bit width transfer data from the respective crossbar parts 5021–5124 through the corresponding reception data lines 5131–5134 and forms 16-bit width transfer data by combining those four 4-bit width transfer data. When the transmission side data processor 5001 requests the arbiter 501 to release the selectors, the arbiter 501 delivers a selector control signal 511 to the four crossbar parts 5021–5024. As a result, the respective crossbar parts change the selectors which connect the transmission data lines 5121–5124 and the corresponding reception data lines 5131–5134 from a conductive state to a non-conductive state.

Figure 6:
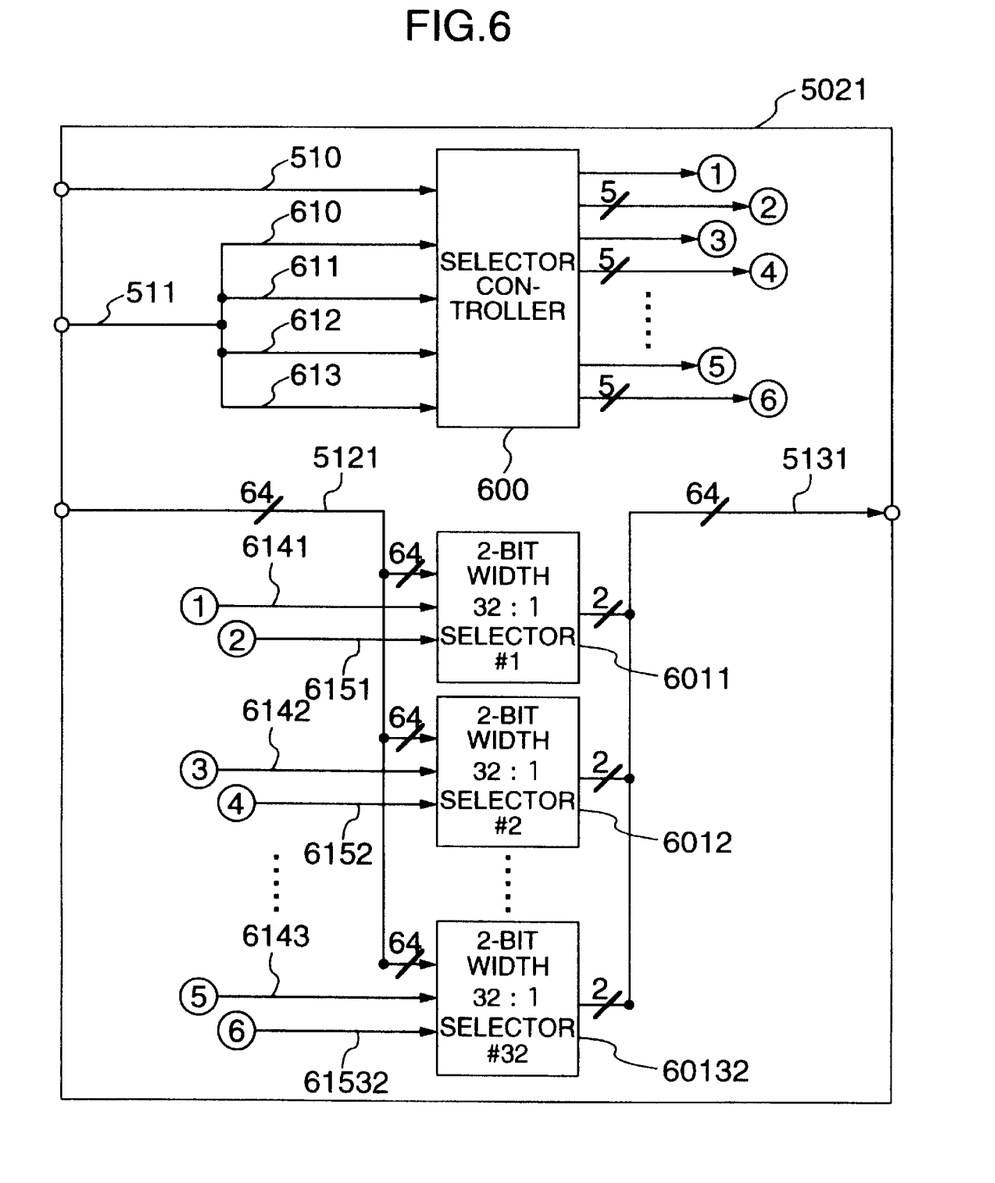
FIG. 6 shows a system indicative of one embodiment of a crossbar part of FIG. 5.

FIG. 6 shows the internal structure of the crossbar part 5021 (other crossbar parts have the same structure). The crossbar part 5021 includes 32 combined 2-bit width 32-to-1 selectors 6011–60132. Although not shown in detail, the nth ones of input terminals (1–32) of the respective selectors 32 are interconnected together to a transmission data line 5121 displayed generally by a single line. The feature of the inventive crossbar parts is that a selector controller 600 has the function of changing the width of transfer data to control the selectors 6011–60132.

As in the prior art, a connection device count selection signal 510 required for achieving the object of the present invention is input along with the selector control signal 511 to the selector controller 600. The former selector control signal 511 is composed of a selector setting signal 610 which becomes "1" when there is a request for selector setting, a selector release signal 611 which becomes "1" when there is a request for selector release, a reception device address signal 612 indicative of the reception side data processor and a transmission device address signal 613 indicative of the transmission side data processor, any one of which signals is delivered from the arbiter 501 (FIG. 5).

Figure 7:
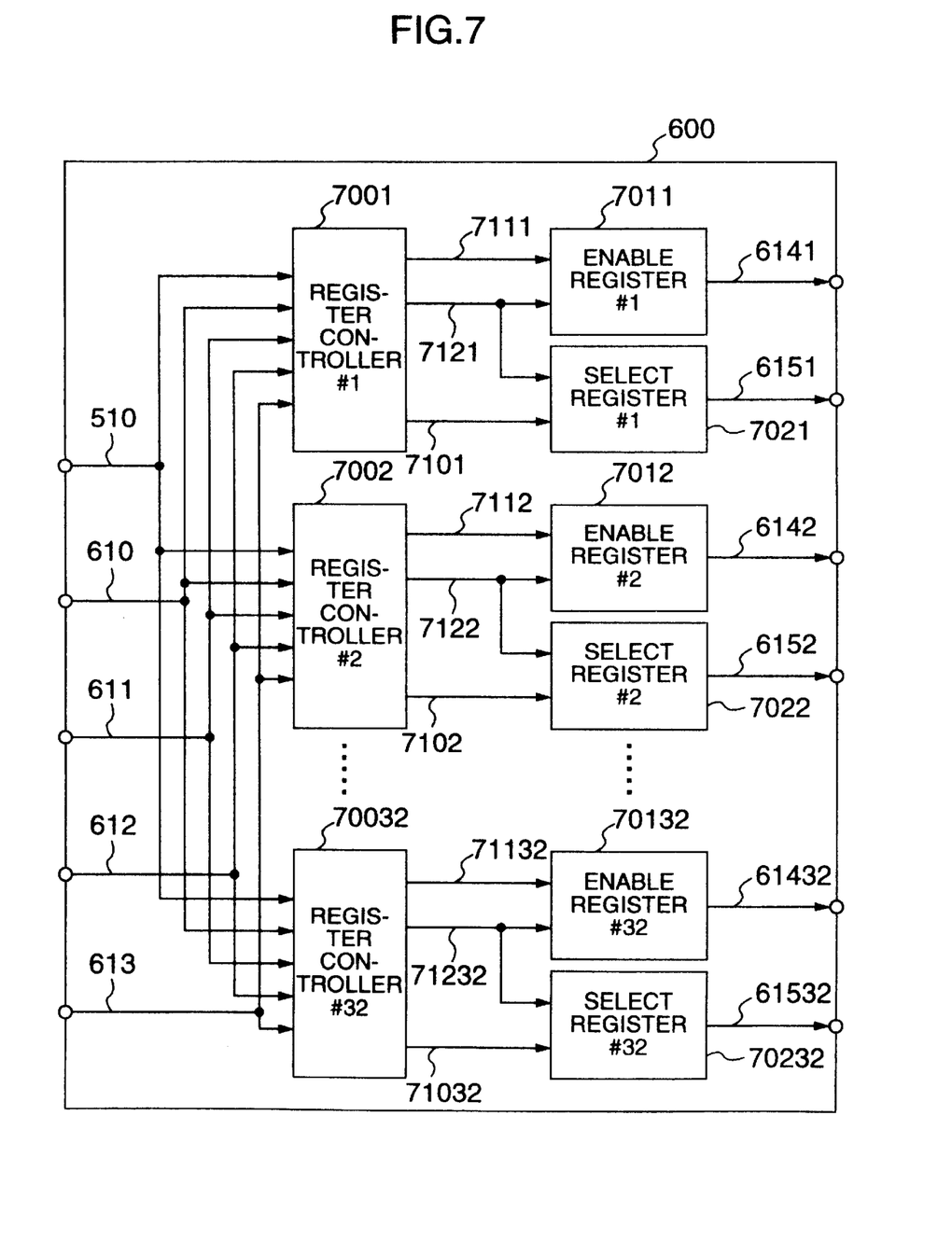
FIG. 7 shows a system indicative of a selector controller of the crossbar part of FIG. 6.

FIG. 7 shows the internal structure of the selector controller 600, which includes 32 enable registers 7011–70132 and selector registers 7021–70232 which are used to record the respective operational states of 32 selectors 6011–60132 (FIG. 6) and 32 register controllers 7001–7032 which control those registers. The respective register controllers deliver set signals 7121–71232 and reset signals 7111–71132 to corresponding enable registers 7011–70132 and deliver set signals 7121–71232 and register set value signals 7101–71032 to the corresponding select registers 7021–70232.

When the arbiter 501 (FIG. 5) delivers a selector setting signal 610 to the register controllers 7001–70032, the register controllers generate set signals 7121–71332 determined by a connection device count selection signal 510 and a reception device address signal 612 and delivers the set signals to the enable registers 7011–70131 and the select registers 7021–70232. Simultaneously, the register controllers 7001–70032 generate the register set value signals 7101–70132 determined by the connection device count selection signal 510 and the transmission device address signal 613 and delivers those signals 7101–71032 to the select registers 7021–70232. When the value of the set signals 7121–71232 becomes "1", the corresponding enable registers 7011–70132 change to "1" the value of the enable signals 6141–61432 which are the outputs thereof and maintain those values "1". When the value of the set signals 7121–71232 becomes "1", the corresponding select registers 7021–70232 handle the value of the select signals 6151–61532 which are the outputs thereof as the value of the register setting value signals 7101–71032 and maintain the value.

When the register controllers 7001–70032 receive the selector release signal 611 from the arbiter 501 (FIG. 5), the register controllers 7001–7032 generate reset signals 7111–71132 determined by the connected device count selection signal 510 and the receiver address signal 612 and deliver those reset signals to the enable registers 7011–70132, which when the value of reset signals 7111–71132 becomes "1", change the enable signals 6141–61432 which are the outputs of the enable registers to "0" and maintain this value.

TABLE 1

(A truth table of register controller (#M))

| INPUT | | | OUTPUT | | |
|---|---|---|---|---|---|
| CONNECTION COUNT SELECT SIGNAL | SELECTOR SETTING SIGNAL | SELECTOR RELEASE SIGNAL | SET SIGNAL | RESET SIGNAL | REGISTER SET VALUE SIGNAL |
| 0 | 1 | 0 | 1 when M − 1 equals receiver address, and 0 otherwise | 0 | transmitter address |
| | 0 | 1 | 0 | 1 when M − 1 equals receiver address, and 0 otherwise | don't care |
| 1 | 1 | 0 | 1 when a quotient of (M − 1) ÷ 2 equals receiver address, and 0 otherwise | 0 | transmitter address × 2 + (rest of (M − 1) ÷ 2) |
| | 0 | 1 | 0 | 1 when a | don't |

TABLE 1-continued (A truth table of register controller (#M))

| INPUT | | | OUTPUT | | |
|---|---|---|---|---|---|
| CONNECTION COUNT SELECT SIGNAL | SELECTOR SETTING SIGNAL | SELECTOR RELEASE SIGNAL | SET SIGNAL | RESET SIGNAL | REGISTER SET VALUE SIGNAL |
| | | | quotient of (M − 1) ÷ 2 equals receiver address, and 0 otherwise | | care |
| 2 | 1 | 0 | 1 when a quotient of (M − 1) ÷ 4 equals receiver address, and 0 otherwise | 0 0 | transmitter address × 4 + (rest of (M − 1) ÷ 4) |
| | 0 | 1 | 0 | 1 when a quotient of (M − 1) ÷ 4 equals receiver address, and 0 otherwise | don't care |
| 3 | 1 | 0 | 1 when a quotient of (M − 1) ÷ 8 equals receiver address, and 0 otherwise | 0 | transmitter address × 8 + (rest of (M − 1) ÷ 8) |
| | 0 | 1 | 0 | 1 when a quotient of (M − 1) ÷ 8 equals receiver address, and 0 otherwise | don't care |
| DON'T CARE | 0 | 0 | 0 | 0 | don't care |

Table 1 is a truth table indicative of the operation of the register controllers corresponding to the connection device count. It is to be noted that the set signals, reset signals, and register set value signals generated by the register controllers vary slightly from register controller to register controller. A character M denotes one of set numbers (#1–#32) added to the respective register controllers. The values "0", "1", "2" and "3" of the connection device count selection signals imply that the connection device counts are 32, 16, 8 and 4, respectively. Setting of the values of such connection device count selection signals is performed, for example, by preparing two signal terminals A and B of each register controller to which the connection device count selection signal is input and combining the signal terminals A and B to power supply terminals or ground terminals. This setting is performed selectively when the crossbar network device is assembled. More specifically, let the power supply potential and the ground potential be logical "1" and "0", respectively. When the value of the connection device count selection signal is "0", the terminals A and B are both connected to the ground terminals; when the value of the connection device count selection signal is "1", the terminal A and B are connected to the ground and power supply terminals, respectively; when the value of the connection device count selection signal is "2", the terminal A and B are connected to the power supply and ground terminals, respectively; and when the value of the connection device count selection signal is "3", the terminal A and B are both connected to the power supply terminals. The values "0", "1", "2" and "3" of the connection device count selection signals indicate that the widths of the transfer data allocated to the respective data processors are 2, 4, 8 and 16 bits, respectively.

As will be seen in Table 1, when there is a request for selector setting (when the value of selector setting signal is "1"), only the register controller where the conditions in Table 1 hold outputs a set signal and a register set value signal having corresponding predetermined values while when there is a request for selector release (when the value of the selector release signal is "1"), only the register controller where the conditions in Table 1 hold outputs a reset signal having a predetermined value. This implies that in the case of the present embodiment where the connection device count is 16, there is a pair of register controllers where the value of the set signal or the reset signal becomes "1" when there is a selector setting request or a selector release request.

In any event, when the selector controller 600 (FIG. 7) receives a selector setting request, it selects selectors to be controlled from among the 32 selectors 6011–60132 on the basis of the connection device count selection signal 510 and the reception device address signal 612, sets the value of the appropriate one of enable signals 6141–61432 for the selected selector at "1", and outputs the same enable signal and outputs as the select signals 6151–61532 the value calculated on the basis of the connection device count selection signal 510 and the transmission device address signal 612. As a result, in the case of the present embodiment, two adjacent selectors such as selectors #1 and #2, selectors #3 and #4, . . . , are selected in pair, and simultaneously select signals 6151–61532 having a transmission device address value×2 are delivered to the corresponding odd-numbered selectors (#1, #3 . . . ) and select signals 6151–61532 having a transmission device address value×2+1 to the even-numbered selectors (#2, #4, . . . ). The selectors of the selected set select, by a 2-bit width, data of a 4-bit width transferred through the transmission data lines 5121–5124 connected to the data processor, for example, shown by 5001 and transfer the selected 4-bit width data, for example, to the reception data line 5132 connected to the reception side data processor designated by 5002. When the selector controller 600 receives a selector release request, it selects a predetermined selector from among the 32 selectors 6011–60132 on the basis of the connection device count selection signal 510 and the reception device address signal 612 in a manner similar to that used in the selector setting and returns to "0" the value of the appropriate one of the enable signals 6141–61432 for the predetermined selector.

While in the above the arrangement of 16 connected data processors having a 16-bit transfer data width has been described, the crossbar parts of this embodiment as they are apply to a case where 32, 8 or 4 data processors are connected, as will be obvious from the truth table 1. It is to be noted that the crossbar parts are required to be connected beforehand to the data processors such that the operation of the data processors based on Truth table 1 is possible.

A large-scaled interconnection switch of the present embodiment includes a plurality of multiple input-to-one output signal lines, one connecting a group of communication controllers in a wide bit width with a common switch arbiter, and a plurality of signal dividing lines, one connecting a communication controller and a corresponding bit slice switch such that an input/output of the communication controller is bit-divided and connected to a corresponding bit slice switch in a one-tone relationship. Thus, communication between the switch arbiter and a communication controller which cannot bit-divide its input/output and performs only relatively intermittent communication, and communication between a bit slice switch and a communication controller which successively performs communication and is capable of bit-dividing its input/output are achieved at high speed, and the number of signal lines connected to the elements concerned are reduced, advantageously.

According to the crossbar parts of the second embodiment, a transfer data width allocated to one data processor is changeable in a range of design, so that the use of one kind of crossbar parts of a standard structure easily brings about the construction of a crossbar network device of a different connection device count. As a result, the time and cost required for manufacturing the crossbar parts or a crossbar network device is reduced greatly.

What is claimed is:

1. A large-scaled interconnection switch in which a plurality of data processors are interconnected to perform data transfer among the plurality of data processors, comprising:

a plurality of communication controllers, one provided for each of the plurality of data processors, for controlling communication between the plurality of data processors, the plurality of communication controllers being divided into a plurality of groups;

a switch arbiter for arbitrating switch setting requests for requesting interconnection of the plurality of data processors from said plurality of communication controllers to output a switch setting control signal wherein each group of communication controllers is connected to the switch arbiter by a multiple input-to-one output signal line so that the plurality of communication controllers in the group are connected to the switch arbiter by one output signal line; and a plurality of bit slice switches having a predetermined bit division count and to which respective input/output signal lines are connected which bit-divide input/output signals of the plurality of communication controllers, each said bit slice switch receiving a switch setting control signal from said switch arbiter and transferring data from a transmission data line from one of the communication controllers to a receiving data line to one of the communication controllers on the basis of the switch setting control signal.

2. A crossbar part used in a large-scaled interconnection switch which interconnects a plurality of data processors and transfers data between the plurality of data processors, comprising:

a plurality of selectors having a desired selection ratio and selector controlling means for controlling the plurality of selectors, said selector controlling means comprising setting means for setting as control data a desired connection device count for data processors which exchange data, and transfer data width changing means for changing transfer data widths allocated to the respective data processors in dependence on the value of the connection device count.

3. A crossbar part used in a large-scaled interconnection switch which interconnects a plurality of data processors and transfers data between the plurality of data processors, comprising:

a plurality of selectors having a desired selection ratio and selector controlling means for controlling the plurality of selectors, said selector controlling means comprising setting means for setting as control data a desired connection device count for data processors which exchange data, and transfer data width changing means for changing transfer data widths allocated to the respective data processors in dependence on the value of the connection device count, wherein said transfer data width changing means comprises means for receiving a request for selector setting from a desired transmission side data processor which transmits data, selecting a target selector to be controlled from among said plurality of selectors on the basis of the value of the connection device count, and changing the selected selector from a non-operating state to an operating state.

4. A crossbar part according to claim 3, wherein said transfer data width changing means comprises means for receiving a request for selector release from the transmission side data processor, selecting a target selector to be controlled from among said plurality of selectors on the basis of the value of the connection device count, and returning the selected selector from an operating state to a non-operating state.

5. A crossbar part according to claim 2, wherein the selectors used have a bit width of P and a select ratio of H:1 and are H in number where P and H each are an integer.

6. A crossbar part according to claim 5, where the selectors used have a 2 bit width and a select ratio of 32:1.

7. A large-scaled interconnection switch according to claim 1, wherein the input/output signal lines bit-divide the input/output signals of the plurality of communication controllers such that the communication controllers are respectively connected to the bit slice switches in a one-to-one relationship.

* * * * *